United States Patent
Azuma et al.

(10) Patent No.: US 8,797,471 B2
(45) Date of Patent: *Aug. 5, 2014

(54) DISPLAY DEVICE WITH A BASE MATERIAL MADE OF PLASTIC

(71) Applicants: Japan Display Inc., Tokyo (JP); Panasonic Liquid Crystal Display Co., Ltd., Himeji (JP)

(72) Inventors: Hitoshi Azuma, Yokohama (JP); Susumu Sasaki, Chiba (JP); Tomio Yaguchi, Sagamihara (JP); Takao Ebine, Otaki (JP); Katsuyuu Takahashi, Mobara (JP); Shoichi Uchino, Annaka (JP); Akiko Iwata, Chiba (JP)

(73) Assignees: Japan Display Inc., Tokyo (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/833,113

(22) Filed: Mar. 15, 2013

(65) Prior Publication Data
US 2013/0242249 A1    Sep. 19, 2013

Related U.S. Application Data

(63) Continuation of application No. 12/320,095, filed on Jan. 16, 2009, now Pat. No. 8,416,356.

(30) Foreign Application Priority Data

Feb. 25, 2008   (JP) .................................. 2008-043293

(51) Int. Cl.
*G09G 3/36*   (2006.01)
*G02F 1/141*  (2006.01)

(52) U.S. Cl.
USPC .............................................. 349/37; 349/147

(58) Field of Classification Search
USPC ........................................... 349/37, 147, 153
See application file for complete search history.

(56) References Cited

U.S. PATENT DOCUMENTS

| | | | |
|---|---|---|---|
| 6,831,727 B2 | 12/2004 | Akiyama et al. |
| 6,849,877 B2 | 2/2005 | Yamazaki et al. |
| 7,499,117 B2 | 3/2009 | Maekawa et al. |
| 7,576,359 B2 | 8/2009 | Hosoya |
| 7,924,388 B2 | 4/2011 | Abe |
| 2006/0238695 A1 | 10/2006 | Miyamoto |

FOREIGN PATENT DOCUMENTS

| | | |
|---|---|---|
| JP | 7-140451 | 6/1995 |
| JP | 2001-083535 A | 3/2001 |
| JP | 2005-115087 | 4/2005 |

*Primary Examiner* — Akm Enayet Ullah
(74) *Attorney, Agent, or Firm* — Juan Carlos A. Marquez; Morris, Manning & Martin, LLP

(57) ABSTRACT

A liquid crystal display device includes a first substrate and a second substrate which sandwiches a liquid crystal between itself and the first substrate, wherein
the first substrate has thin film transistors and a wiring connection portion in which are formed terminals connected to the thin film transistors,
a wiring substrate connected to the terminals is disposed in the wiring connection portion,
the second substrate is a plastic substrate, and has an adhesive layer and an inorganic insulating layer formed on top of the adhesive layer, and
the adhesive layer covers the wiring connection portion and one portion of the wiring substrate.

18 Claims, 7 Drawing Sheets

DISPLAY DEVICE WITH A BASE MATERIAL MADE OF PLASTIC

This application is a Continuation Application of U.S. application Ser. No. 12/320,095 filed Jan. 16, 2009. The present application claims priority from U.S. application Ser. No. 12/320,095 filed Jan. 16, 2009, which claims the priority of Japanese applications JP2008-043293 filed on Feb. 25, 2008, the content of which is hereby incorporated by reference into this application.

BACKGROUND OF THE INVENTION

1. Technical Field

The present invention relates to a display device, and particularly, to an ultrathin, lightweight and flexible liquid crystal display device and a manufacturing method thereof.

2. Related Art

A so-called flat panel type display device, such as a liquid crystal display device or an organic EL display device, is configured of one substrate (an active matrix substrate or a TFT substrate), on which is formed a thin film transistor (TFT) circuit, and an opposite substrate or a sealing substrate, which holds a liquid crystal layer or an emitting layer between itself and the TFT layer. It is common that a glass material is used for these substrates. In particular, the TFT substrate requires a high temperature process in a TFT formation. Consequently, a glass substrate is used which is of an inexpensive material having a heat resistance and a low heat expansion coefficient. However, glass being fragile, there is a limitation in reducing a thickness of the substrate, posing an impediment to promoting a reduction in thickness and weight, and an increase in flexibility, of the display device.

FIG. 6 is a plan view of a heretofore known liquid crystal display device. Also, FIG. 7 is a sectional view taken along line X-X' of FIG. 6. The liquid crystal display device shown in FIG. 6 is configured by sealing a liquid crystal LC between a principal surface of a thin film transistor substrate (a TFT substrate) SUB1, which is a first glass substrate, and a principal surface of an opposite substrate (a color filter substrate or a CF substrate) SUB2, which is a second glass substrate, and bonding the thin film transistor substrate SUB1 and the opposite substrate SUB2 together with a seal agent SL. Thin film transistors TFT, unshown pixel electrodes, and an unshown wiring system are formed on the principal surface of the thin transistor substrate SUB1. A color filter CF divided into segments by an unshown black matrix or, in a case of a TN type liquid crystal display device, opposite electrodes (not shown) are formed on the principal surface of the opposite substrate SUB2.

One edge of the opposite substrate SUB2 is slightly retracted from a corresponding edge of the thin film transistor substrate SUB1, exposing one portion of the principal surface of the thin film transistor substrate SUB1. A wiring connection portion TMA is formed in the exposed portion. A wiring substrate FPC is connected to the wiring connection portion TMA. The wiring substrate FPC is a so-called flexible printed substrate, and one extremity thereof is connected to the wiring connection portion TMA of the thin film transistor substrate SUB1, while the other extremity is connected to an external circuit.

As heretofore described, a semiconductor thin film for a thin film transistor circuit is formed on the thin film transistor substrate SUB1, but as a high temperature process is required in this formation step, a glass substrate is used as the substrate. For this reason, in order to bend the display device, it is necessary to make the glass substrate thin. However, as shown in JP-A-2005-115087, as there is a limitation in reducing a thickness of the glass substrate, there is also a limitation on a bending degree of the display device.

A flexible display device which can be freely bent cannot be made using the glass substrate. For this reason, as shown in JP-A-7-140451, the display device can be freely transformed by using a plastic substrate.

However, the plastic material having no heat resistance, it is hard to form a high performance semiconductor thin film, and it is difficult to use the plastic substrate as a TFT substrate to which is applied the high temperature process which forms the semiconductor film for the thin film transistor circuit.

SUMMARY OF THE INVENTION

An object of the invention is to provide a liquid crystal display device which makes a plastic substrate a component member with no relationship to a high temperature process which forms a semiconductor film.

The liquid crystal display device of the invention includes an insulating substrate on which are formed pixels having thin film transistors, wherein the insulating substrate has a first substrate, on which is provided a thin film transistor circuit including a pixel circuit, and a second substrate which sandwiches and seals a liquid crystal layer between itself and the first substrate.

Then, it has a feature such that, the second substrate, or both the first substrate and the second substrate are formed of plastic substrates, a principal surface of the first substrate has a silicon layer attached thereto with a first adhesive, and the thin film transistor circuit and a wiring connection portion, to which is connected a wiring substrate which, being led outside a display area from the thin film transistor circuit across a seal agent, inputs signals and voltages for a display from an external circuit, are provided on the silicon layer, while a principal surface of the second substrate has a silicon layer attached thereto with a second adhesive, a color filter layer is provided on the silicon layer, and the second adhesive fills a space outside the seal agent between the first substrate and the second substrate, covering the wiring connection portion and the wiring substrate connected to the wiring connection portion.

In a manufacturing of the liquid crystal display device, one or both of the first substrate and the second substrate are formed of glass substrates. In this condition, of the first substrate and the second substrate, one or both glass substrates are chemically or mechanically removed, and plastic substrates or polarizing plates are affixed. Also, in the case in which one glass substrate is processed in this way, the other glass substrate is also chemically or mechanically removed, and a plastic substrate or a polarizing plate is affixed, thereby forming a liquid crystal display device in which both substrates are configured of the plastic substrates.

By it being possible to make the display surface of the display device curved, a flexibility of the display device is improved. By this means, a design selectivity of the display device is increased. Also, a functionality, a weight saving and a miniaturization can be realized. The invention, not being limited to the liquid crystal display device, can also be similarly applied to a flat type of display device, such as an OLED (an organic EL display) or an FED (a field emission display).

DESCRIPTION OF THE PREFERRED EMBODIMENTS

Figure 1:
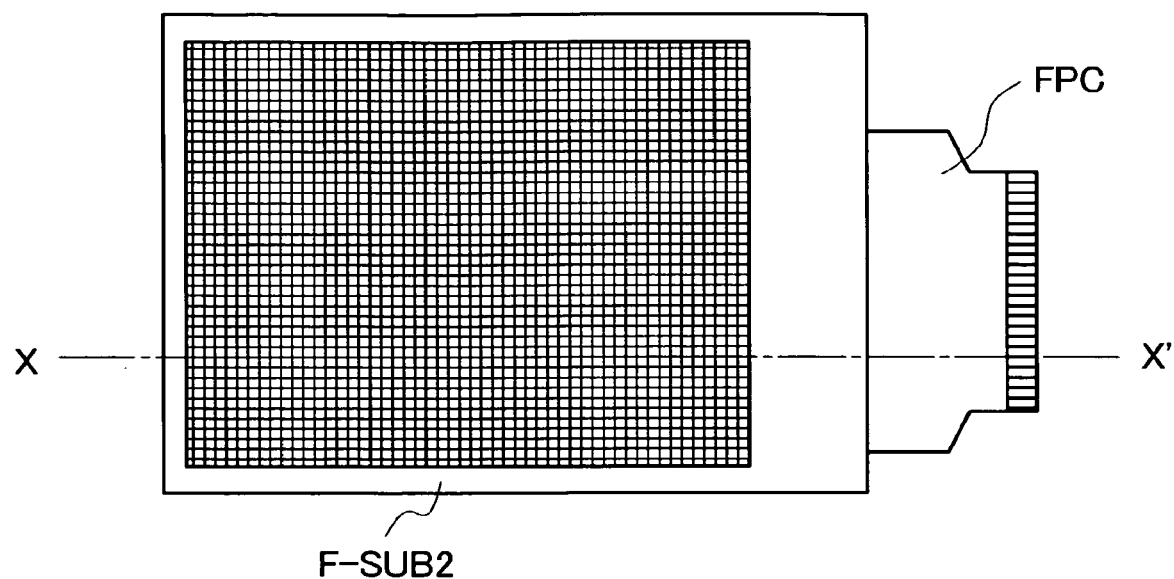
FIG. 1 is a plan view of a liquid crystal display device illustrating an embodiment 1 of a display device of the invention.

Hereafter, a detailed description will be given of most preferred embodiments of the invention, referring to the drawings thereof.

Embodiment 1

Figure 2:
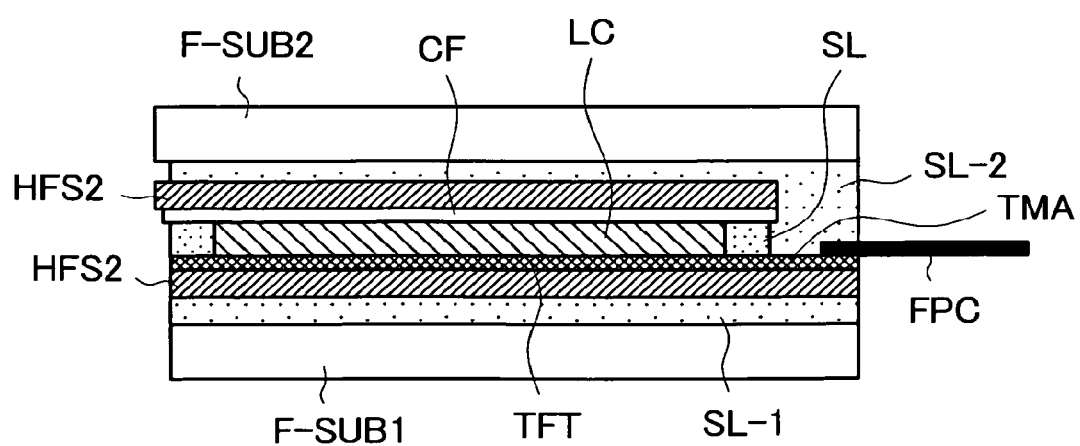
FIG. 2 is a sectional view taken along line X-X' of FIG. 1.

FIG. 1 is a plan view of a liquid crystal display device illustrating an embodiment 1 of a display device of the invention. FIG. 2 is a sectional view taken along line X-X' of FIG. 1. The liquid crystal display device of the embodiment 1 shown in FIG. 1 is configured by sealing in a liquid crystal LC between a principal surface of a TFT side flexible substrate F-SUB1, which is a first plastic substrate, and a principal surface of a CF side flexible substrate F-SUB2, which is a second plastic substrate, and bonding them together with a frame shaped seal agent SL encircling a display area.

A feature of the embodiment lies in adopting a structure in which a wiring substrate FPC is sandwiched between the TFT side flexible substrate F-SUB1 and the CF side flexible substrate F-SUB 2.

As shown in FIG. 2, on the principal surface of the TFT side flexible substrate F-SUB1 is formed a silicon nitride layer (a second etch stopper layer HFS2 to be described hereafter) which, being a transparent inorganic insulating layer, is attached thereto with an adhesive SL-1. Also, a pixel circuit, configured of thin film transistors TFT, and a wiring connection portion TMA are formed on the silicon nitride layer. A plurality of terminals led outside the display area from the pixel circuit, configured of the thin film transistors TFT, across the seal agent SL are formed in the wiring connection portion TMA. Furthermore, a wiring substrate (a flexible printed substrate) FPC, which inputs signals and voltages from unshown external circuits (a display control circuit substrate and a ICON substrate), is connected to the plurality of terminals.

Also, the principal surface of the CF side flexible substrate F-SUB2 has a transparent silicon nitride layer (a second etch stopper layer HFS2 to be described hereafter) attached thereto with a second adhesive SL-2, and a color filter layer CF is provided on the silicon nitride layer. The second adhesive SL-2 fills a space outside the seal agent SL between the TFT side flexible substrate F-SUB1 and the CF side flexible substrate F-SUB2, covering the wiring connection portion TMA and the wiring substrate (the flexible printed substrate) FPC.

The seal agent SL, and the first adhesive SL-1 and second adhesive SL-2, are made of different materials. It is desirable that the seal agent SL is made of a material which does not contaminate the liquid crystal. Then, it is desirable that the first adhesive SL-1 and the second adhesive SL-2 are made of a transparent material having a bendable property. This is because the liquid crystal display of the invention is supposed to be a flexible display of which a display surface is bendable. Furthermore, it is desirable that the first adhesive SL-1 and the second adhesive SL-2 are made of a material having a characteristic of preventing moisture from entering a liquid crystal layer.

Figure 3A:
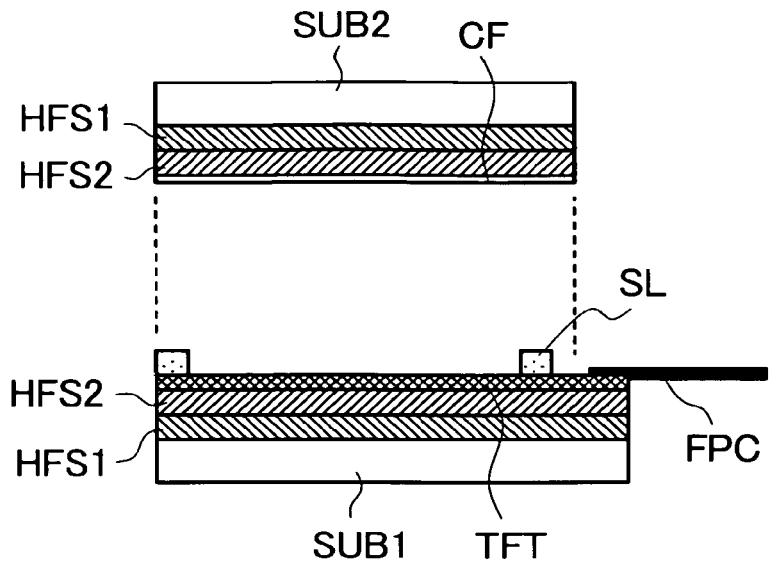
FIGS. 3A to 3H are views illustrating a method of manufacturing the liquid crystal display device described in the embodiment 1 of the invention.

FIGS. 3A to 3H are views illustrating a method of manufacturing the liquid crystal display device described in the embodiment 1 of the invention. FIG. 3A, being a sectional view of a condition in which a thin film transistor substrate SUB1 and an opposite substrate SUB2 are caused to face each other, shows a condition before the liquid crystal is sealed in. The first etch stopper layer HFS1 and the second etch stopper layer HFS2 are laminated, in this order, onto a principal surface of the thin film transistor substrate SUB1. The pixel circuit configured of the thin film transistors TFT is formed on the second etch stopper layer HFS2.

The first etch stopper layer HFS1 and the second etch stopper layer HFS2 are also laminated, in this order, onto a principal surface of the opposite substrate SUB2. A color filter is formed on the second etch stopper layer HFS2. An illustration of a black matrix or the like provided on the opposite substrate SUB2 is omitted. Also, an oriented film is formed as a topmost layer on each substrate, but an illustration is omitted here. The seal agent SL is formed encircling the display area of the thin film transistor substrate SUB1. The wiring substrate FPC is attached to the wiring connection portion TMA at one edge of the thin film transistor substrate SUB1.

Mo—W is suitable for the first etch stopper layer HFS1, while silicon nitride is suitable for the second etch stopper layer HFS2. The first etch stopper layer HFS1 is insoluble in an etchant for a glass substrate. Also, the second etch stopper layer HFS2 is insoluble in an etchant for the first etch stopper layer HFS1.

Figure 3B:
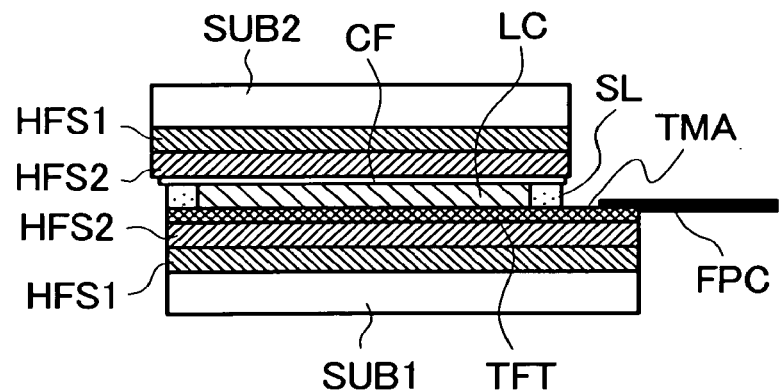

As shown in FIG. 3B, the principal surface of the opposite substrate SUB2 and the principal surface of the thin film transistor substrate SUB1 are bonded together, and the liquid crystal LC is sealed in within a bonding space. A perimeter of the space between the two substrates is sealed with the seal agent SL.

Figure 3C:
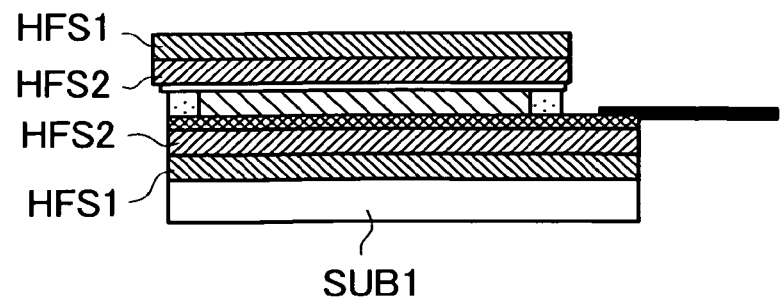

In this condition, the opposite substrate SUB2 is dissolved and removed, by a full etching, with a glass dissolving etchant. At this time, an etching of the CF side second etch stopper layer HFS2 is stopped by the CF side first etch stopper layer HFS1 (FIG. 3C).

Figure 3D:
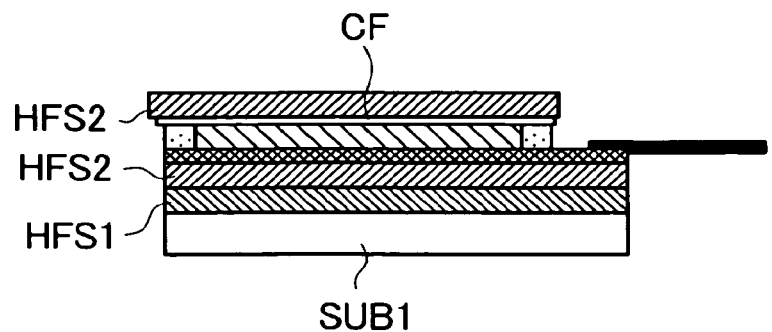

Next, the CF side first etch stopper layer HFS1 is dissolved and removed by a full etching (FIG. 3D). An etchant etching the CF side first etch stopper layer HFS1 does not etch the CF side second etch stopper layer HFS2. That is, the color filter CF is protected by the CF side second etch stopper layer HFS2.

Figure 3E:
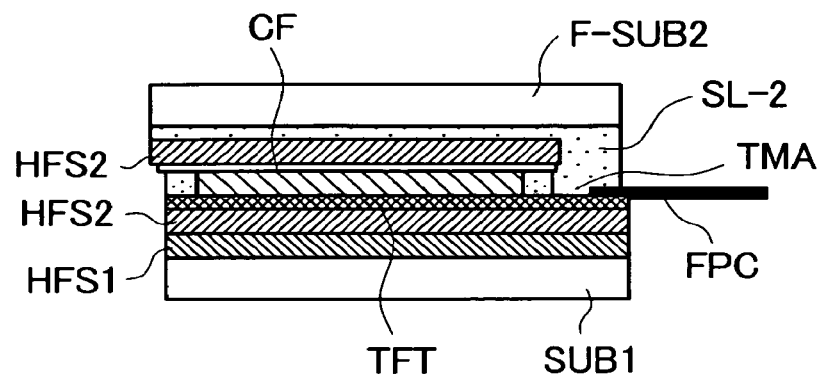

The CF side second adhesive SL-2 is applied covering the CF side second etch stopper layer HFS2, the wiring connection portion TMA, and one portion of the wiring substrate FPC. The CF side flexible substrate F-SUB2, which is the plastic substrate, is attached with the second adhesive SL-2 (FIG. 3E).

By the second adhesive SL-2 covering a terminal portion of the wiring substrate FPC, a stress concentration on the terminal portion of the wiring substrate FPC is avoided.

Figure 3F:
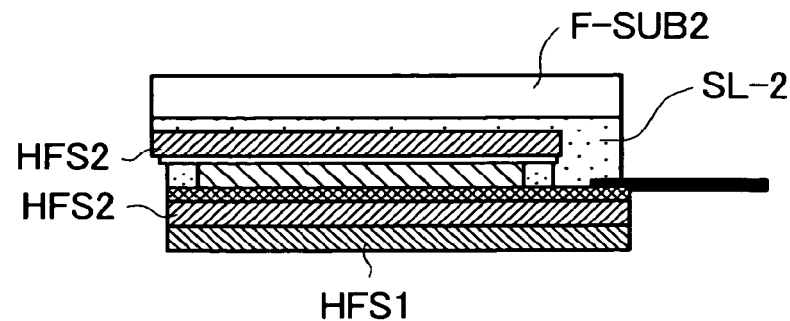

Next, the thin film transistor substrate SUB1 is dissolved and removed, by a full etching, with a glass dissolving etchant. At this time, an etching of the TFT side second etch stopper layer HFS2 is stopped by the TFT side first etch stopper layer HFS1 (FIG. 3F).

Figure 3G:
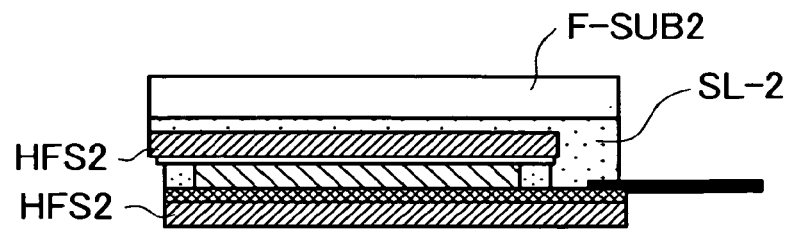

Next, the TFT side first etch stopper layer HFS1 is dissolved and removed by a full etching (FIG. 3G). An etchant etching the TFT side first etch stopper layer HFS1 does not etch the TFT side second etch stopper layer HFS2. That is, the thin film transistors TFT are protected by the TFT side second etch stopper layer HFS2.

Figure 3H:
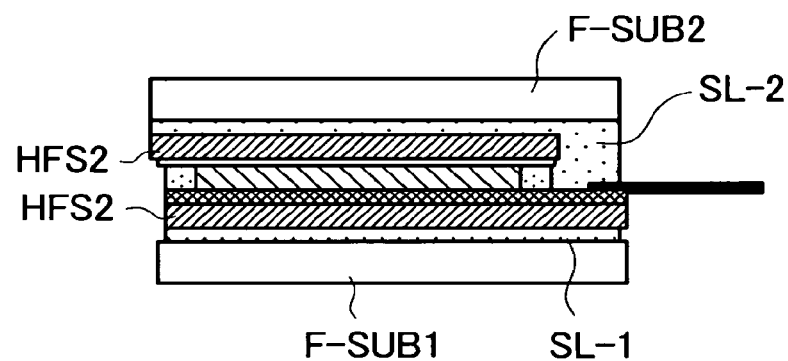

The first adhesive SL-1 is applied covering the TFT side second etch stopper layer HFS2. The TFT side flexible substrate F-SUB1, which is the plastic substrate, is attached with the first adhesive SL-1 (FIG. 3H).

It is possible, through the heretofore described steps, to obtain the liquid crystal display device described in the embodiment 1 of the invention.

Embodiment 2

Next, a description will be given of an embodiment 2 of the invention.

Figure 4:
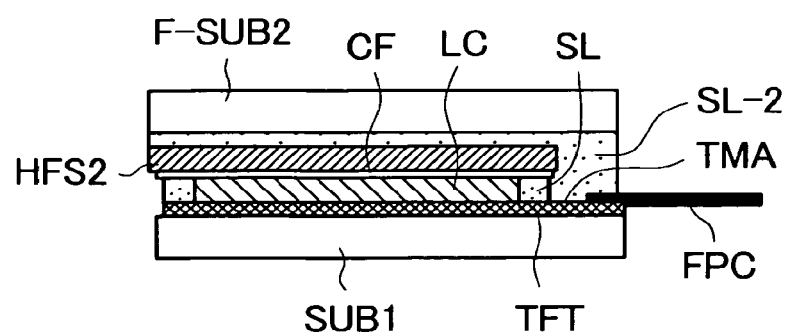
FIG. 4 is a sectional view of a liquid crystal display device illustrating an embodiment 2 of the display device of the invention.

FIG. 4 is a sectional view of a liquid crystal display device illustrating the embodiment 2 of the display device of the invention. FIG. 4 corresponds to the section taken along line X-X' of FIG. 1. The liquid crystal display device of the embodiment 2 shown in FIG. 4 is configured by sealing in a liquid crystal LC between a principal surface of a thin film transistor substrate SUB1, which is a glass substrate, and a principal surface of a CF side flexible substrate F-SUB2, which is a plastic substrate, and bonding them together with a frame shaped seal agent SL encircling a display area.

A feature of the embodiment lies in adopting a structure in which a wiring substrate FPC is sandwiched between the thin film transistor substrate SUB1, which is the glass substrate, and the CF side flexible substrate F-SUB 2.

As shown in FIG. 4, the principal surface of the CF side flexible substrate F-SUB2 has a silicon nitride layer (a second etch stopper layer HFS2), which is a transparent inorganic insulating layer, attached thereto with a second adhesive SL-2, and a color filter layer CF is provided on the silicon nitride layer. The second adhesive SL-2 fills a space outside the seal agent SL between the thin film transistor substrate SUB1 and the CF side flexible substrate F-SUB2, covering the heretofore described wiring connection portion TMA and the heretofore described wiring substrate (the flexible printed substrate) FPC connected thereto.

The seal agent SL and the second adhesive SL-2 are made of different materials. The materials of the seal agent SL and second adhesive SL-2 are the same as those of the embodiment 1.

Figure 5A:
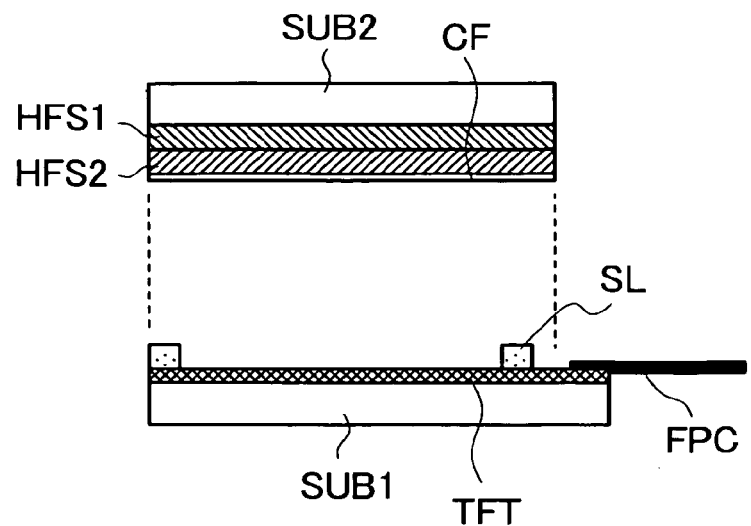
FIGS. 5A to 5E are views illustrating a method of manufacturing the liquid crystal display device described in the embodiment 2 of the invention.

FIGS. 5A to 5E are views illustrating a method of manufacturing the liquid crystal display device described in the embodiment 2 of the invention. FIG. 5A, being a sectional view of a condition in which the thin film transistor substrate SUB1 and an opposite substrate SUB2 are caused to face each other, shows a condition before the liquid crystal is sealed in. A pixel circuit configured of thin film transistors TFT is formed on the principal surface of the thin film transistor substrate SUB1.

A first etch stopper layer HFS1 and the second etch stopper layer HFS2 are laminated, in this order, onto a principal surface of the opposite substrate SUB2. A color filter is formed on the second etch stopper layer HFS2. An illustration of a black matrix or the like provided on the opposite substrate SUB2 is omitted. Also, an oriented film is formed as a topmost layer on each substrate, but an illustration is omitted here. The seal agent SL is formed encircling the display area of the thin film transistor substrate SUB1. The wiring substrate FPC is attached to the wiring connection portion TMA at one edge of the thin film transistor substrate SUB1.

Mo—W is suitable for the first etch stopper layer HFS1, while silicon nitride is suitable for the second etch stopper layer HFS2. The first etch stopper layer HFS1 is insoluble in an etchant for the opposite substrate SUB2. Also, the second etch stopper layer HFS2 is insoluble in an etchant for the first etch stopper layer HFS1.

Figure 5B:
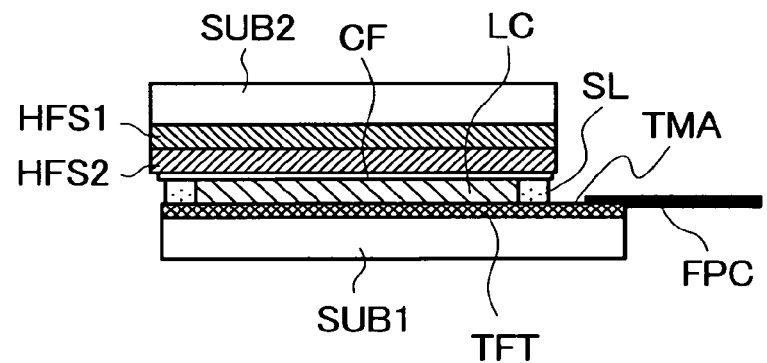

As shown in FIG. 5B, the principal surface of the opposite substrate SUB2 and the principal surface of the thin film transistor substrate SUB1 are bonded together, and the liquid crystal LC is sealed in within a bonding space. A perimeter of the space between the two substrates is sealed with the seal agent SL.

Figure 5C:
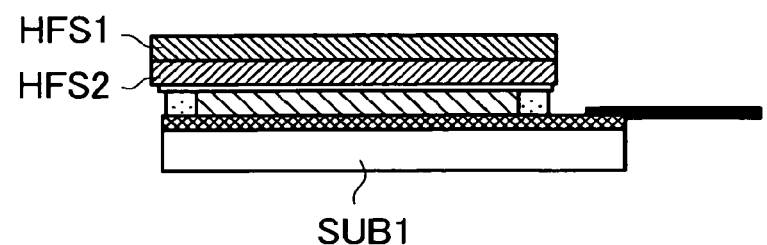

In this condition, the opposite substrate SUB2 is dissolved and removed, by a full etching, with a glass dissolving etchant. At this time, an etching of the CF side second etch stopper layer HFS2 is stopped by the CF side first etch stopper layer HFS1 (FIG. 5C).

Figure 5D:
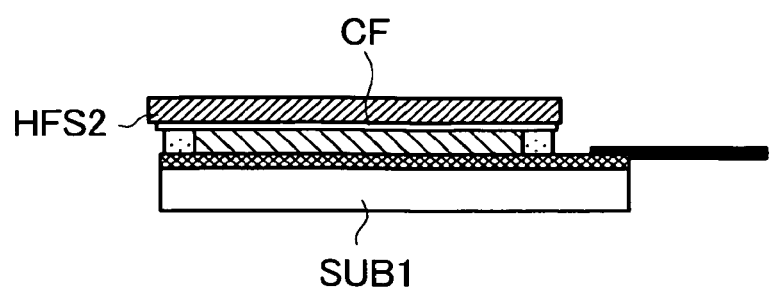

Next, the CF side first etch stopper layer HFS1 is dissolved and removed by a full etching (FIG. 5D). An etchant etching the CF side first etch stopper layer HFS1 does not etch the CF side second etch stopper layer HFS2. That is, the color filter CF is protected by the CF side second etch stopper layer HFS2.

Figure 5E:
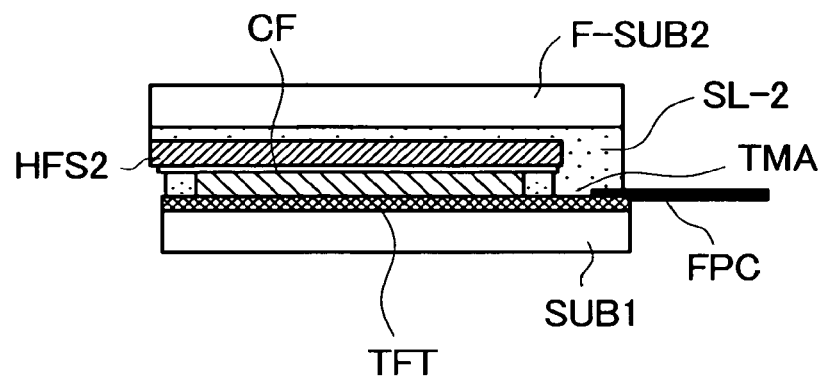
Figure 6:
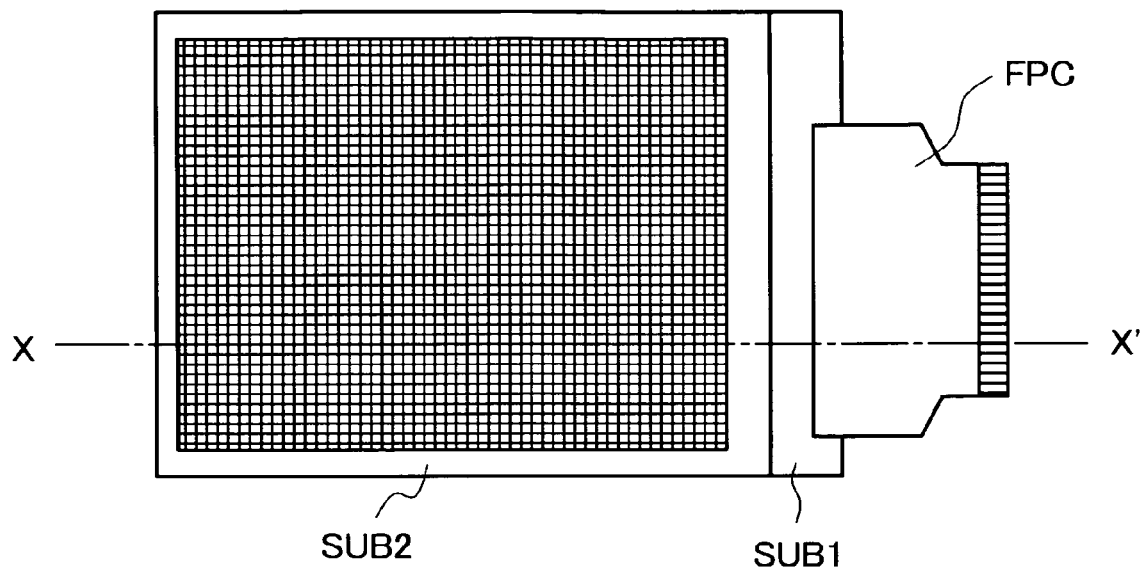
FIG. 6 is a plan view of a heretofore known liquid crystal display device.
Figure 7:
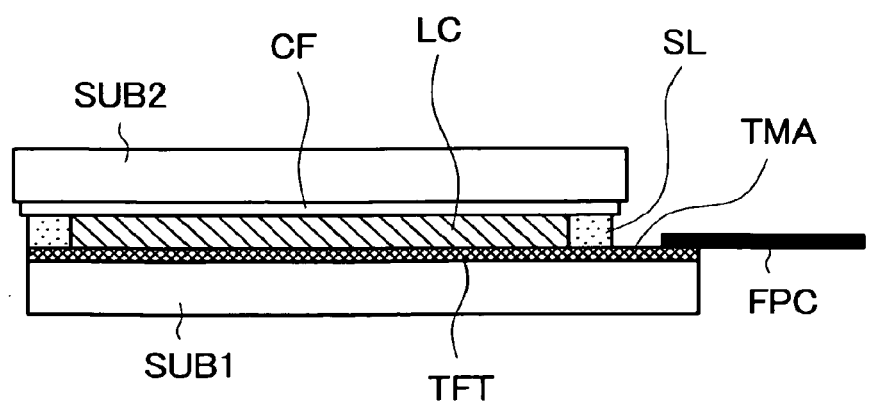
FIG. 7 is a sectional view taken along X-X' of FIG. 6.

The second adhesive SL-2 is applied covering the CF side second etch stopper layer HFS2, the wiring connection portion TMA, and one portion of the wiring substrate FPC. The CF side flexible substrate F-SUB2, which is the plastic substrate, is attached with the second adhesive SL-2 (FIG. 5E).

By the second adhesive SL-2 covering a terminal portion of the wiring substrate FPC, a stress concentration on the terminal portion of the wiring substrate FPC is avoided. The thin film transistor substrate SUB1 is reduced in thickness by means of a polishing or the like when necessary.

It is possible, through the heretofore described steps, to obtain the liquid crystal display device described in the embodiment 2 of the invention.

What is claimed is:

1. A display device comprising a base material made of plastic, thin film transistors formed above the base material, a wiring connection portion formed above the base material, wherein
    the wiring connection portion has terminals which are connected to the thin film transistors,
    a wiring substrate is disposed in the wiring connection portion and connected to the terminals,
    the base material has a first region which overlaps the wiring connection portion and a second region which overlaps the thin film transistors,
    the wiring connection portion and one portion of the wiring substrate are covered by an adhesive layer, and
    the adhesive layer is disposed from the first region to the second region continuously.

2. The display device according to claim 1, wherein the base material is a plastic substrate.

3. The display device according to claim 2, wherein the plastic substrate is a flexible substrate.

4. The display device according to claim 1, wherein the wiring substrate is a flexible printed circuit board.

5. The display device according to claim 1, wherein the adhesive layer is a coated layer.

6. The display device according to claim 1, wherein an inorganic insulating layer is formed above the base material, the thin film transistors formed on the inorganic insulating layer.

7. The display device according to claim 6, wherein the inorganic insulating layer contains silicon nitride.

8. The display device according to claim 1, further comprising a counter substrate which faces the base material,
wherein the counter substrate is attached to the base material with the adhesive layer.

9. The display device according to claim 8, wherein the counter substrate is a plastic substrate.

10. The display device according to claim 8, wherein the counter substrate overlaps with the wiring connection portion and the one portion of the wiring substrate.

11. The display device according to claim 8, wherein
the counter substrate has a third region which faces the second region, and
the adhesive layer overlaps with the third region in a plan view.

12. A display device comprising a base material made of plastic, thin film transistors formed above the base material, a wiring connection portion formed above the base material, wherein
the wiring connection portion has terminals which are connected to the thin film transistors,
a wiring substrate is disposed in the wiring connection portion and connected to the terminals,
the base material has a first region which overlaps the wiring connection portion and a second region which overlaps the thin film transistors,
the wiring connection portion and one portion of the wiring substrate are covered by a coated layer, and
the coated layer is disposed from the first region to the second region continuously.

13. The display device according to claim 12, wherein an inorganic insulating layer is formed above the base material, the thin film transistors formed on the inorganic insulating layer.

14. The display device according to claim 12, wherein the base material is a plastic substrate.

15. The display device according to claim 1, further comprising a display area, wherein the thin film transistors are disposed in the display area.

16. The display device according to claim 1, wherein the base material has a main surface, and the adhesive layer covers an entirety of the main surface.

17. The display device according to claim 12, further comprising a display area, wherein the thin film transistors are disposed in the display area.

18. The display device according to claim 12, wherein the base material has a main surface, and the coated layer covers an entirety of the main surface.

* * * * *